(12) United States Patent
Van Phan et al.

(10) Patent No.: US 10,924,983 B2
(45) Date of Patent: Feb. 16, 2021

(54) METHODS AND APPARATUS FOR DISCOVERY SIGNAL TRANSMISSION BETWEEN A PLURALITY OF DEVICES

(71) Applicant: Nokia Solutions and Networks Oy, Espoo (FI)

(72) Inventors: Vinh Van Phan, Oulu (FI); Ling Yu, Kauniainen (FI); Yixue Lei, Beijing (CN); Zexian Li, Espoo (FI); Kodo Shu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/126,833

(22) PCT Filed: Mar. 17, 2014

(86) PCT No.: PCT/EP2014/055293
§ 371 (c)(1),
(2) Date: Sep. 16, 2016

(87) PCT Pub. No.: WO2015/139722
PCT Pub. Date: Sep. 24, 2015

(65) Prior Publication Data
US 2017/0099628 A1  Apr. 6, 2017

(51) Int. Cl.
*H04W 72/00* (2009.01)
*H04W 48/16* (2009.01)
*H04W 8/00* (2009.01)
*H04W 16/06* (2009.01)
*H04W 72/04* (2009.01)
*H04W 16/32* (2009.01)

(52) U.S. Cl.
CPC ........... *H04W 48/16* (2013.01); *H04W 8/005* (2013.01); *H04W 16/06* (2013.01); *H04W 72/00* (2013.01); *H04W 72/04* (2013.01); *H04W 16/32* (2013.01)

(58) Field of Classification Search
CPC ..... H04W 48/16; H04W 8/005; H04W 72/04; H04W 36/00; H04W 76/023; H04W 72/02; H04W 4/005
See application file for complete search history.

(56) References Cited

U.S. PATENT DOCUMENTS

| | | | | |
|---|---|---|---|---|
| 2012/0020421 A1* | 1/2012 | Larsson | ................ | H04L 5/0032 375/260 |
| 2012/0129536 A1* | 5/2012 | Zou | ..................... | H04W 52/146 455/444 |
| 2013/0225195 A1* | 8/2013 | Tinnakornsrisuphap | ................... | H04W 48/06 455/453 |
| 2014/0128080 A1* | 5/2014 | Mohan | .............. | H04W 36/0061 455/437 |

(Continued)

OTHER PUBLICATIONS

3GPP TSG-RAN WG3 #83, Discussion on Resource Coordination in inter-celL Discovery Deployment, Feb. 10-14, 2014, 3GPP.*

(Continued)

*Primary Examiner* — Said M Elnoubi
(74) *Attorney, Agent, or Firm* — Harrington & Smith

(57) ABSTRACT

A method includes coordinating one or more pools of resources for discovery signal transmission between a plurality of devices, at least one of said pools of resources being shared by at least one larger cell and at least one smaller cell at least partially in a coverage area of the said larger cell.

19 Claims, 5 Drawing Sheets

(56) References Cited

U.S. PATENT DOCUMENTS

2015/0257065 A1* 9/2015 Frederiksen ...... H04W 52/0206
370/331
2015/0382142 A1* 12/2015 Kim .................... H04W 4/022
455/41.2

OTHER PUBLICATIONS

3GPP TSG-RAN WG3 #83, Discussion on Resource Coordination in inter-cell Discovery Deployment, Feb. 2014 (Year: 2014).*
3GPP TSG-RAN WG3 #83, Discussion on Resource Coordination in inter-cell Discovery Deployment, Feb. 10-14, 2014 (Year: 2014).*
Zhao, Yuxin, et al., "D2D Neighbor Discovery Interference Management for LTE Systems", © 2013 IEEE, 5 pgs.
3GPP TSG-RAN WG3 #83, Prague, Czech Republic, Feb. 10-14, 2014, R3-140094, "Discussion on Resource Coordination in inter-cell Discovery Deployment", 4 pgs.
3GPP TR36.843 V0.3.1 (Nov. 2013), "$3^{rd}$ Generation Partnership Project; Technical Specification Group RAN; Study on LTE Device to Device Proximity Services-Radio Aspects; (Release 12)", 32 pgs.

* cited by examiner

METHODS AND APPARATUS FOR DISCOVERY SIGNAL TRANSMISSION BETWEEN A PLURALITY OF DEVICES

The present application relates to methods and apparatus to be used in relation to device to device communication.

A communication system may be seen as a facility that enables communication sessions between two or more nodes such as fixed or mobile communication devices, access points such as nodes, base stations, servers, hosts, machine type servers, routers, and so on. A communication system and compatible communicating devices typically operate in accordance with a given standard or specification which sets out what the various entities associated with the system are permitted to do and how that should be achieved. For example, the standards, specifications and related protocols may define the manner how communication devices shall communicate with the access points, how various aspects of the communications shall be implemented and how the devices and functionalities thereof shall be configured.

An example of cellular communication systems is an architecture that is being standardized by the 3rd Generation Partnership Project (3GPP). A recent development in this field is often referred to as the long-term evolution (LTE) or long-term evolution advanced (LTE advanced) of the Universal Mobile Telecommunications System (UMTS) radio-access technology. In LTE base stations providing the cells are commonly referred to as enhanced NodeBs (eNB). An eNB may provide coverage for an entire cell or similar radio service area.

A user may access the communication system by means of an appropriate communication device. A communication device of a user is often referred to as user device (UE), user device or terminal. A communication device is provided with an appropriate signal receiving and transmitting arrangement for enabling communications with other parties. In wireless systems a communication device typically provides a transceiver station that may communicate with another communication device such as e.g. a base station and/or another user device. A communication device such as a user device (UE) may access a carrier provided by a base station, and transmit and/or receive on the carrier.

Signals may be carried on wired or wireless carriers. Examples of wireless systems include public land mobile networks (PLMN), satellite based communication systems and different wireless local networks, for example wireless local area networks (WLAN). Wireless systems may be divided into coverage areas referred to as cells, such systems being often referred to as cellular systems. A cell may be provided by a base station, there being various different types of base stations. Different types of cells may provide different features. For example, cells may have different shapes, sizes, functionalities and other characteristics. A cell is typically controlled by a control node.

Some communication systems may support proximity-based services such as a device-to-device (D2D) or proximity services (ProSe) communication in which a user device or user device or other device of similar hierarchy may communicate directly with another user device or user device. For example a user device may transmit directly to another user device without having to traverse a base station, or node (such as a (e)NodeB).

According to an aspect, there is provided a method comprising; coordinating one or more pools of resources for discovery signal transmission between a plurality of devices, at least one of said pools of resources being shared by at least one larger cell and at least one smaller cell at least partially in a coverage area of the said larger cell, The method may comprise causing advertising of said at least one common pool of resources to at least one device in the coverage area.

The method may be performed by a control apparatus in a base station associated with the larger cell, a base station associated with a smaller cell, an operation and maintenance (O&M) server or any other suitable control entity.

According to another aspect, there is provided a method comprising; causing advertising of one or more pools of resources for discovery signal transmission between a plurality of devices, at least one of said pools of resources being shared by at least one larger cell and at least one smaller cell at least partially in a coverage area of the said larger cell, said advertising being to at least one device in the coverage area.

The method may be performed by an apparatus, for example a control apparatus, in a base station associated with the larger cell or a base station associated with a smaller cell.

Various of the following features may be used with either or both of the aspects mentioned above.

At least one pool of resources may be commonly shared by at least one larger cell and said at least one smaller cell.

The method may comprise allocating resources from said commonly shared pool on a non device specific basis.

At least one pool of resources may exclusively be shared by at least one larger cell and said at least one smaller cell.

The method may comprise allocating resources from said exclusively shared pool on a device specific basis.

The pool of resources may be at least partially provided by a base station associated with said larger cell.

The pool of resources may be additionally provided by at least one base station respectively associated with said at least one smaller cell.

The method may comprise advertising of pool information by said at least one larger cell base station and said at least one smaller cell base station to at least one device.

The method may comprise advertising pool information only by said at least one larger cell base station.

The method may comprises causing information to be sent from a smaller cell base station to at least one device, said information indicating that said device is to obtain pool information from said large cell base station.

The method may comprises causing pool information to be provided to said at least one smaller cell base station by said larger cell base station.

The method may comprise receiving allocation information indicating that said smaller cell base station intends to use resources which it contributes to a pool as resources allocated to said smaller cell base station. This may be received at base station associated with the larger cell.

The method may comprise causing allocation information to be sent from the smaller cell base station indicating that said smaller cell base station intends to use resources which it contributes to a pool as resources allocated to said smaller cell base station.

The method may comprise allocating said pool of resources to one or more cells of said at least one larger cell and at least one smaller cell.

The method may comprise resolving conflicts between said allocation information received from two or more smaller cell base stations.

A base station of said at least one larger cell may be configured to control at least one base station respectively associated with said at least one smaller cell.

The method may comprise controlling by the larger cell base station of the assigning of resources of said pool According to another aspect, there is provided a method comprising: causing a resource from at least one pool to be used, at least one pool comprising of resources for discovery signal transmission between a plurality of devices, the or each pool of resources being shared by at least one larger cell and at least one smaller cell at least partially in a coverage area of the said larger cell, At least one pool may be such that the allocation of resources from said pool is on a non device specific basis or a device specific basis.

The pool which provides said resource which is used may be dependent on whether said device is idle or active.

The pool which provides said resource which is used may be dependent on at least one of the cell with which the device is associated; and capabilities of the cell with which the device is associated.

The method may comprise responsive to determining that a resource from a first type of pool is to be used by a device, causing said device to camp in said larger cell.

The method may be performed in a device.

According to another aspect, there is provided an apparatus comprising; means for coordinating one or more pools of resources for discovery signal transmission between a plurality of devices, at least one of said pools of resources being shared by at least one larger cell and at least one smaller cell at least partially in a coverage area of the said larger cell, The apparatus may comprise means for causing the advertising of said at least one common pool of resources to at least one device in the coverage area.

The apparatus may be in a base station associated with the larger cell, a base station associated with a smaller cell, an operation and maintenance server or any other suitable control entity.

According to another aspect, there is provided an apparatus comprising; means for causing advertising one or more pools of resources for discovery signal transmission between a plurality of devices, at least one of said pools of resources being shared by at least one larger cell and at least one smaller cell at least partially in a coverage area of the said larger cell, said advertising being to at least one device in said coverage area.

The apparatus, for example a control apparatus, may be in a base station associated with the larger cell or a base station associated with a smaller cell.

Various of the following features may be used with either or both of the aspects mentioned above.

At least one pool of resources may be commonly shared by at least one larger cell and said at least one smaller cell.

The apparatus may comprise means for allocating resources from said commonly shared pool on a non device specific basis.

At least one pool of resources may exclusively be shared by at least one larger cell and said at least one smaller cell.

The apparatus may comprise means for allocating resources from said exclusively shared pool on a device specific basis.

The pool of resources may be at least partially provided by a base station associated with said larger cell.

The pool of resources may be additionally provided by at least one base station respectively associated with said at least one smaller cell.

The advertising of pool information may only be by said at least one larger cell base station.

The apparatus may comprise means for causing information to be sent from a smaller cell base station to at least one device, said information indicating that said device is to obtain pool information from said large cell base station.

The apparatus may comprise means for causing pool information to be provided to said at least one smaller cell base station by said larger cell base station.

The apparatus may comprise means for receiving allocation information indicating that said smaller cell base station intends to use resources which the smaller cell base station contributes to said pool as the resources allocated to said smaller cell base station. This may be received at base station associated with the larger cell.

The apparatus may comprise means for causing allocation information to be sent from the smaller cell base station indicating that said smaller cell base station intends to use resources which the smaller cell base station contributes to said pool as the resources allocated to said smaller cell base station.

The apparatus may comprise means for allocating said pool of resources to one or more cells of said at least one larger cell and at least one smaller cell.

The apparatus may comprise means for resolving conflicts between said allocation information received from two or more smaller cell base stations.

A base station of said at least one larger cell may be configured to control at least one base station respectively associated with said at least one smaller cell.

The apparatus may comprise means for controlling assigning of resources of said pool. This may be done by the larger cell base station.

According to another aspect, there is provided an apparatus in a device comprising: means for causing a resource from at least one pool to be used, at least one pool comprising of resources for discovery signal transmission between a plurality of devices, the or each pool of resources being shared by at least one larger cell and at least one smaller cell at least partially in a coverage area of the said larger cell, At least one pool may be such that the allocation of resources from said pool is on a non device specific basis or a device specific basis.

The pool which provides said resource which is used may be dependent on whether said device is idle or active.

The pool which provides said resource which is used may be dependent on at least one of the cell with which the device is associated; and capabilities of the cell with which the device is associated.

The apparatus may comprise means responsive to determining that a resource from a first type of pool is to be used, causing said device to camp in said larger cell.

According to another aspect, there is provided an apparatus, said apparatus comprising at least one processor and at least one memory including computer code for one or more programs, the at least one memory and the computer code configured, with the at least one processor, to cause the apparatus at least to: coordinate one or more pools of resources for discovery signal transmission between a plurality of devices, at least one of said pools of resources being shared by at least one larger cell and at least one smaller cell at least partially in a coverage area of the said larger cell, The at least one memory and the computer code may be configured, with the at least one processor, to cause the advertising of at least one common pool of resources to at least one device in the coverage area.

The apparatus may be a control apparatus in a base station associated with the larger cell, a base station associated with a smaller cell, an operation and maintenance server or any other suitable control entity.

According to another aspect, there is provided an apparatus, said apparatus comprising at least one processor and at least one memory including computer code for one or more programs, the at least one memory and the computer code configured, with the at least one processor, to cause the apparatus at least to: cause advertising of one or more pools of resources for discovery signal transmission between a plurality of devices, at least one of said pools of resources being shared by at least one larger cell and at least one smaller cell at least partially in a coverage area of the said larger cell, said advertising being to at least one device in the coverage area.

The apparatus, for example a control apparatus, may be in a base station associated with the larger cell or a base station associated with a smaller cell.

Various of the following features may be used with either or both of the aspects mentioned above.

At least one pool of resources may be commonly shared by at least one larger cell and said at least one smaller cell.

The at least one memory and the computer code may be configured, with the at least one processor, to allocate resources from said commonly shared pool on a non device specific basis.

At least one pool of resources may exclusively be shared by at least one larger cell and said at least one smaller cell.

The at least one memory and the computer code may be configured, with the at least one processor, to allocate resources from said exclusively shared pool on a device specific basis.

The pool of resources may be at least partially provided by a base station associated with said larger cell.

The pool of resources may be additionally provided by at least one base station respectively associated with said at least one smaller cell.

The at least one memory and the computer code may be configured, with the at least one processor, to cause advertising of pool information by said at least one larger cell base station and said at least one smaller cell base station to at least one device.

The advertising of pool information may only be by said at least one larger cell base station.

The at least one memory and the computer code may be configured, with the at least one processor, to cause information to be sent from a smaller cell base station to at least one device, said information indicating that said device is to obtain pool information from said large cell base station.

The at least one memory and the computer code may be configured, with the at least one processor, to advertise pool information to be provided to said at least one smaller cell base station. The apparatus may be in the larger cell base station.

The at least one memory and the computer code may be configured, with the at least one processor, to receive allocation information indicating that said smaller cell base station intends to use resources which that smaller cell base station contributes to said pool as the resources allocated to said smaller cell base station. This may be received at base station associated with the larger cell.

The at least one memory and the computer code may be configured, with the at least one processor, to cause allocation information to be sent from the smaller cell base station indicating that said smaller cell base station intends to use resources which it contributes to said pool as the resources allocated to said smaller cell base station.

The at least one memory and the computer code may be configured, with the at least one processor, to allocate said pool of resources to one or more cells of said at least one larger cell and at least one smaller cell.

The at least one memory and the computer code may be configured, with the at least one processor, to resolve conflicts between said allocation information received from two or more smaller cell base stations.

A base station of said at least one larger cell may be configured to control at least one base station respectively associated with said at least one smaller cell.

The at least one memory and the computer code may be configured, with the at least one processor, to control the assigning of resources of said pool, the apparatus being in the larger cell base station.

According to another aspect, there is provided an apparatus in a device, said apparatus comprising at least one processor and at least one memory including computer code for one or more programs, the at least one memory and the computer code configured, with the at least one processor, to cause the apparatus at least to: cause a resource from at least one pool to be used, at least one pool comprising of resources for discovery signal transmission between a plurality of devices, the or each pool of resources being shared by at least one larger cell and at least one smaller cell at least partially in a coverage area of the said larger cell, At least one pool may be such that the allocation of resources from said pool is on a non device specific basis.

At least one pool may be such that the allocation of resources from said pool is on a non device specific basis or a device specific basis.

The pool which provides said resource which is used may be dependent on whether said device is idle or active.

The pool which provides said resource which is used may be dependent on at least one of the cell with which the device is associated; and capabilities of the cell with which the device is associated.

The at least one memory and the computer code may be configured, with the at least one processor, responsive to determining that a resource from a first type of pool, to cause a device to camp in said larger cell.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

Embodiments of the present application will now be described with reference to the following figures in which.

Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

Figure 1:
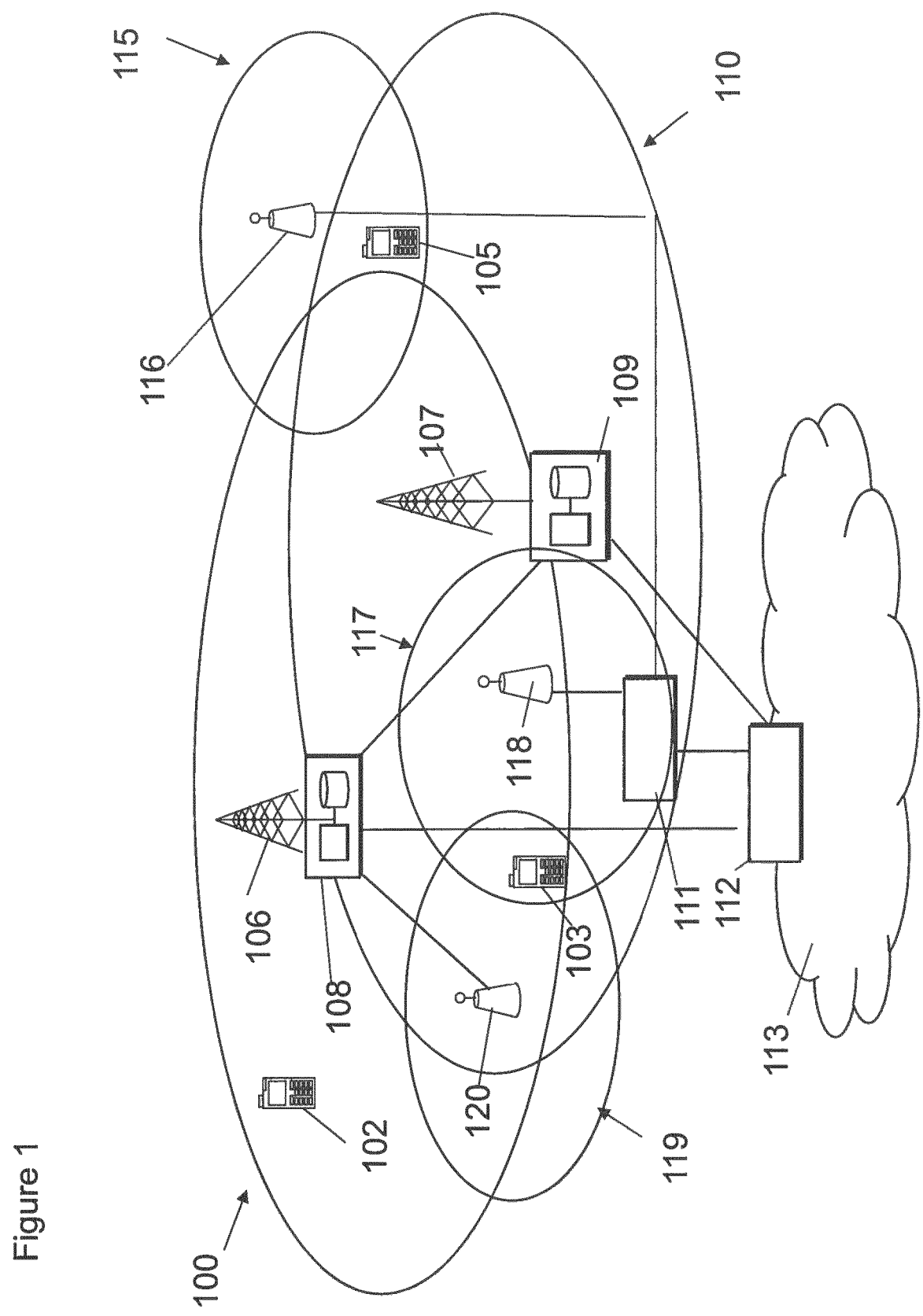
FIG. 1 shows an example of a communications system in which some embodiments may be implemented.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. In the example, stations 116 and 118 are connected via a gateway 111 whilst station 120 connects via the controller apparatus 108. In some embodiments, the smaller stations may not be provided. The smaller base stations may provide a pico cell, a micro cell, and/or the like.

Figure 2:
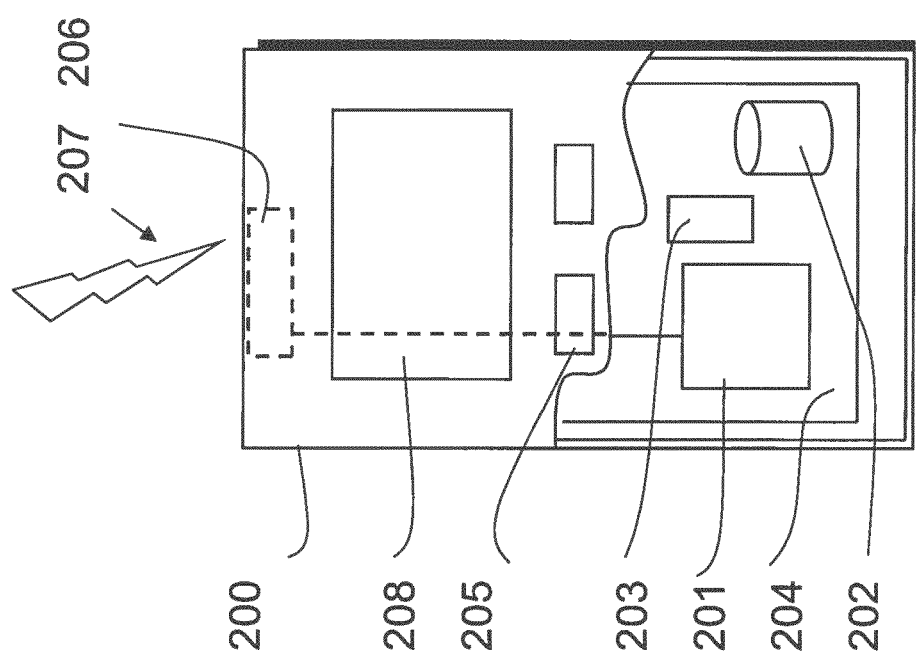
FIG. 2 shows a schematic diagram of a mobile communication device according to some embodiments.

A possible communication device will now be described in more detail with reference to FIG. 2 showing a schematic, partially sectioned view of a communication device 102. Such a communication device is often referred to as user equipment (UE) or terminal. An appropriate communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The device 102 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the device.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

The communication devices 102, 103, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Some embodiments may relate to proximity services (ProSe) and D2D communications. Some embodiments may relate to D2D discovery for an in-network-coverage scenario. For example, 3GPP ProSe considers there to be three coverage scenarios for D2D discovery and communication: in network coverage (when the UES are in the network coverage area), out of network coverage (when the UEs are out of the network coverage area) and in partial network coverage (where one or more UEs involved in D2D is in the coverage area and one or more UEs are out of the coverage area).

ProSe may allow two devices such as two UEs to communicate directly, without the communication going via a base station. ProSe may allow two UEs which are served by the same base station to have a locally routed data path therebetween, bypassing the core network. D2D may require one or more of the following.

A UE needs to be able to discover other UEs
A UE needs to measure the channel from the other UE.
A UE needs to receive signals via an UL resource.
A UE needs to maintain a link with a base station and with one or more other UEs.

The base station needs to have some control over the D2D links.

Two types of D2D discovery are defined in 3GPP specification TR 36.843

Type 1: a discovery procedure where resources for discovery signal transmission are allocated on a non UE specific basis. It should be appreciated that all the resources may be for all UEs or group of UEs.

Type 2: a discovery procedure where resources for discovery signal transmission are allocated on a per UE specific basis. The type 2 is broken down in to Type 2A and Type 2B.

Type 2A: Resources are allocated for each specific transmission instance of discovery signals Type 2B: Resources are semi-persistently allocated for discovery signal transmission.

In a HetNet environment, a serving radio access network consists of different cell layers such as smaller cells, for example pico and/or micro cells, deployed under a larger cell, for example a macro cell, umbrella. Some embodiments may address how to coordinate resource pools and allocate resources for ProSe D2D discovery in such a HetNet environment.

It has been suggested ProSe D2D discovery should adopt both the aforementioned Type 1 and Type 2 resource allocation procedures in an adaptive fashion.

Some embodiments may provide a method for facilitating a ProSe discovery in a HetNet environment which is based upon: (i) having a pre-configured Type 1 resource pool made of macro-cell resources for the umbrella macro coverage commonly shared between the macro cell and all other smaller cells underneath; and/or (ii) having an optional pre-configured Type 2 resource pool made of macro- and/or other smaller cell resources exclusively shared between the macro cell and all other smaller cells underneath.

It is noted that in some embodiments for both Type 1 and Type 2, at least discovering UEs may need to know of the relevant Type 1 and Type 2 resource pools beforehand in order to detect and receive discovery signals sent by discoverable UEs.

In some embodiments the Type 1 and/or Type 2 behaviour may be as set out below.

For Type 1:

In one embodiment, the controlling macro eNB (or other control apparatus) determines a common pool for Type 1 discovery over the macro cell coverage area and updates all the smaller cells in the coverage area of the macro cell. The common Type 1 resource pool refers to the resource from the macro eNB.

Optionally, in some embodiments, the macro eNB may coordinate to form the common pool from resources committed by individual small cells as well.

Thus, all relevant eNBs inside the macro umbrella may broadcast information about the same common pool for Type 1 discovery. In an alternative, individual eNB inside the macro umbrella other than the controlling macro eNB may indicate to UEs inside its respective coverage area to read and use the common pool for Type 1 from the controlling macro eNB.

In some embodiments, the above two alternatives may be combined to handle a cell-edge coverage issue in which a small cell at the border of the macro cell may partially be inside the macro cell coverage area and therefore the first alternative where all cells broadcast the pool information may be better. In one embodiment, a flexible combination of the two alternatives may have at least those small cells at the edge of the macro cell coverage area fully advertise the common pool of Type 1 and those small cells in the middle of the macro cell coverage indicate to UEs inside its respective coverage area to read and use the common pool of Type 1 information from the controlling macro eNB.

Some embodiments may allow for efficient mobility support of UEs within the umbrella macro coverage. That is UEs regardless of whether selected (that is being idle) or serving eNB (that is being active) under the umbrella macro coverage will be able to discover each other without having to follow a number of system information updates from different cells. That is UEs regardless of their state (idle or active) and regardless of which eNB they are associated in the the umbrella cell will be able to discover each other without having to follow a number of system information updates from different cells. The term serving eNB may be used with reference to an active UE where the UE is connected to the serving eNB. For an idle UE, the UE may select a cell (selected eNB) to camp in.

In one embodiment, an idle UE under the umbrella macro coverage area which has a need to use Type 1 discovery may select the macro cell to camp in with a higher priority over a detected smaller cell. This may particularly be the case when the smaller cell does not explicitly indicate about Type 1 (or even Type 2) but is able to support D2D discovery. In this way, an idle UE does not need to read system information from small cells just because of D2D operation. Rather the idle UE will get the information it requires in order to perform D2D.

Thus in some HetNet scenarios UEs regardless of selected (being idle) or serving eNB (being active) under the umbrella macro coverage will be able to discover each other without having to follow many instances of system information updates from different cells.

Figure 4:
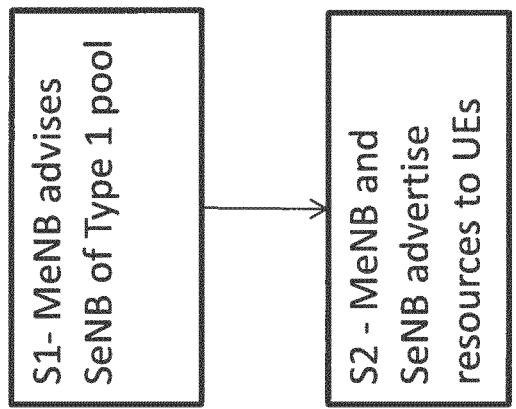
FIG. 4 is a flow diagram depicting the method steps carried out in accordance with an embodiment.

Reference is made to FIG. 4 which shows a first method. In this embodiment, there is coordination between macro eNB (MeNB) and smaller cell eNBs (SeNB) within the coverage area of the MeNB to have a common Type 1 pool for the umbrella macro eNB coverage for all UEs.

In step S1, the MeNB may keep the SeNBs informed over S1/X2 interface between the MeNB and the SeNBs of the up-to-date Type 1 pool.

In S2, the MeNBs and SeNBs may advertise the common Type 1 pool to UEs.

Figure 5:
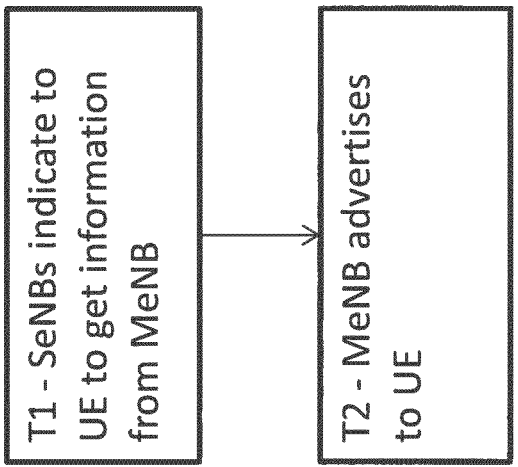
FIG. 5 is a flow diagram depicting the method steps carried out in accordance with an embodiment.

Reference is made to FIG. 5 which shows a second method. In this embodiment, there is again coordination between macro eNB (MeNB) and smaller cell eNBs (SeNB) within the coverage area of the MeNB to have a common Type 1 pool for the umbrella macro eNB coverage for all UEs;

In step T1, SeNBs are configured to indicate to their UEs to find the Type 1 information from MeNB. This may be done by broadcast messages or dedicated signalling.

In step T2, only MeNBs may advertise the common Type 1 pool.

In some embodiments, there is a D2D discovery related cell selection criteria and/or one or more triggers for a D2D UE. These may be advertised to the UE, for example in steps S2 or T2 by the MeNB and/or SeNB. Alternatively or additionally, this criteria and/or triggers may be preconfigured to the UE.

Figure 7:
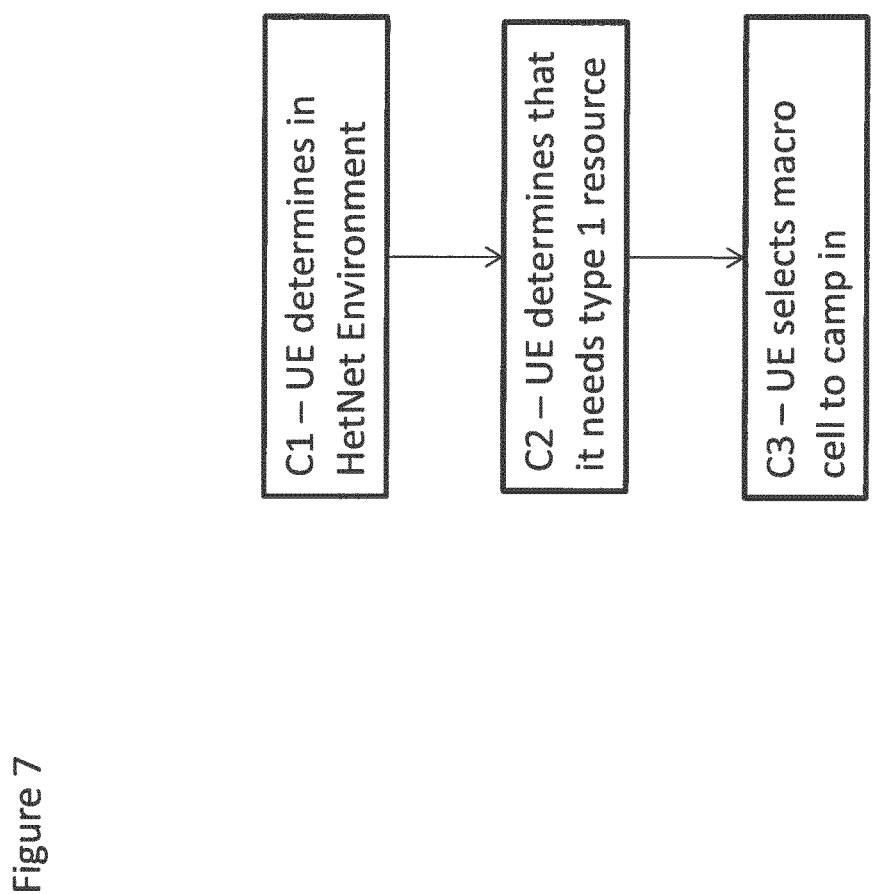
FIG. 7 shows another flow diagram depicting method steps carried out by a user device.

For example reference is made to FIG. 7. In step C1, a D2D capable UE in an idle state may be preconfigured to determine that it is in the HetNet umbrella of interest (e.g., based on having detected both SeNB and MeNB and received e.g. Type 1 and/or D2D related information thereof).

In step C2, the UE determines that it needs to have a Type 1 resource to transmit discovery signal for others devices (and may not necessarily need to discover other devices).

In step C3, the UE should re-select/select the macro cell to camp in as a result of being in a HetNet environment and needing a Type 1 resource.

For Type 2:

In one embodiment, the controlling macro eNB and smaller cell eNBs may coordinate to form and maintain a preconfigured Type 2 pool. The pool may be made up of macro- and/or the respective smaller cell resources. The pool may be shared exclusively between the macro cell and all the respective smaller cells. The controlling eNB may be assumed to have the coordinating responsibility to avoid possible resource conflicts among the involved cells, as detailed in the next embodiment.

This pool can then be advertised to UEs in the umbrella macro coverage in a similar fashion to that of the Type 1 pool above. Thus, it may be enough for the macro eNB to broadcast the resource pool information. The small cells may inform their UEs to get such the information from the macro if their UEs are not configured to determine and carry out that by themselves. In other embodiments, the same resource pool information may need to be transmitted by all the involved eNBs.

In some embodiments, toward UEs, there is coordination between macro eNB (MeNB) and smaller cell eNBs (SeNB) in the coverage area of the MeNB to have common information of the Type 2 pool advertised to all UEs inside the umbrella macro eNB coverage.

In one embodiment, an individual eNB which contributes Type 2 resources to the preconfigured Type 2 pool may use its own resources as the exclusive portion allocated to that individual eNB. This may require that the controlling eNB coordinate with individual eNBs to resolve any possible conflict between those exclusive portions beforehand.

In an alternative embodiment, the controlling macro eNB may alternatively or additionally redistribute exclusive portions of the preconfigured Type 2 pool to individual involved cells to use the resources in a more flexible and efficient sharing fashion. In this alternative, flexible resource negotiation on a need basis may be provided between the controlling macro eNB and smaller-cell eNBs.

Figure 6:
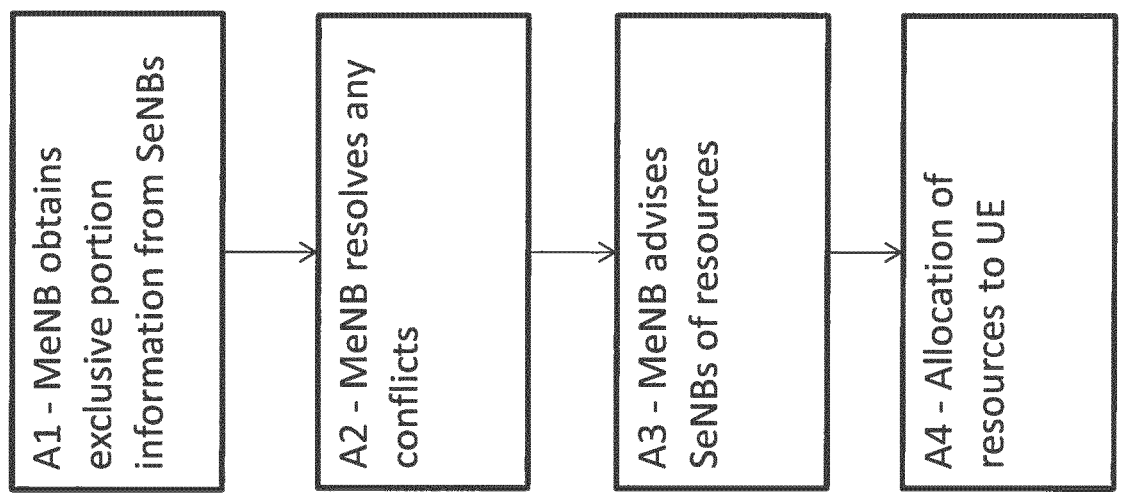
FIG. 6 is a flow diagram depicting the method steps carried out in accordance with another embodiment.

Reference is made to FIG. 6. In step A1, the MeNB may obtain from any SeNB which has contributed Type 2 resources to the pool, information about the resources which that SeNB would like to use as its exclusive portion. In some embodiments, the SeNB may simply provide information about their resources. In some embodiments, this step may be omitted.

In step A2, the MeNB may resolve any conflict and/or allocate exclusive resources to the SeNBs.

In step A3, the MeNB may advise the SeNBs of their allocated resources. This may comprise confirming to a SeNB that the SeNB is able to use its own resources as the exclusive portion or allocating different resources to the SeNB.

In step A4, there is allocating of resources to the UE as required. This may be by the SeNB and/or the MeNB.

In another embodiment, the controlling eNB may act as a central server for assigning a preconfigured Type 2 resource to a UE under the umbrella macro coverage, regardless of the serving eNB. In this case, if the serving eNB is other than the controlling macro eNB, the serving eNB upon a UE request for a preconfigured Type 2 resource may request the controlling macro eNB for that resource and forward the allocated resources to the requesting UE.

In one embodiment, if both Type 1 and Type 2 are supported in the umbrella macro coverage area, then a D2D UE served by a small cell may use a Type 1 resource of the macro cell and/or a Type 2 resource of the local cell. If a smaller cell supports D2D discovery but does not exclusively indicate support for preconfigured Type 2 then the UE being active in D2D discovery and served by the smaller cell is assumed having a Type 1 allocation and the use of Type 1 and possibly dynamic Type 2. In some embodiments, a UE may take either type 1 resource from the macro or type 2 resource from a smaller cell.

It is noted that the eNB may indicate information of Type 1 and Type 2 pools to UEs. Transmitting UEs using Type 2 should be in connected state whereas transmitting UEs using Type 1 can be in either connected or idle. In this regard, UE in the idle mode may determine to use Type 1 by itself; and eNB may determine to configure UE in connected state to use either Type 1 or Type 2.

The common Type 2 pool may be provided for the macro coverage area. This may be coordinated and formed by the macro eNB. This pool may consist of different exclusive, non-overlapping portions which may be contributed by different cells and/or re-distributed by the macro to different cells to be used exclusively. In some embodiments, the broadcast control information for indicating this pool (at least by the macro eNB) may comprise of a full list of those different portions.

For a robust operation with possible support of both Type 1 and Type 2, a UE in some embodiments, may not be provided with the information of the common Type 2 pool from the serving cell using dedicated signalling. However in other embodiments a UE may receive the information via dedicated signalling from the serving cell. This may for example be used on an individual case basis or a individual UE basis.

Some embodiments may allow for efficient D2D discovery over the umbrella macro coverage in HetNet environment, coordinated and controlled by the macro eNB.

In some embodiments, the controlling eNB of the macro cell may comprise the control apparatus which allocates resources for the macro and pico cells. The coordination between the controlling eNB of the macro cell and the SeNBs may be over S1/X2 interface.

In some embodiments the control apparatus may be provided in a network element such as an O&M server or the like. The common pool may be configured to MeNB and SeNBs by the control apparatus in the O&M server. In this embodiment, there may be an implicit coordination between MeNB and SeNBs on how to advertise the pool information to UEs.

Figure 3:
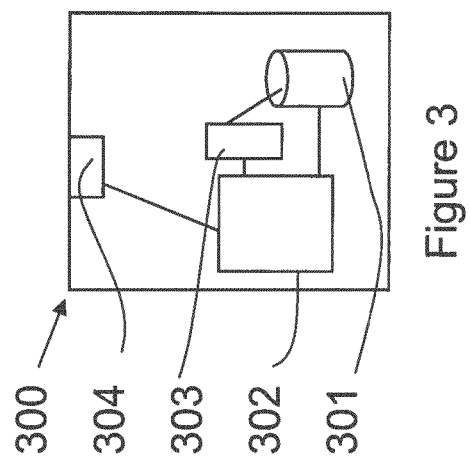
FIG. 3 shows a schematic diagram of a control apparatus according to some embodiments.

FIG. 3 shows an example of a control apparatus. The control apparatus comprises at least one memory 301, at least one data processing unit 302, 303 and an input/output interface 304. Via the interface the control apparatus can be coupled to receive and/or transmit data. For example the control apparatus can be configured to execute an appropriate software code to provide the control functions. The control apparatus may be provided in one or more of MeNB, a SeNB, an O&M server and any other suitable control entity.

It will be appreciated that proximity-based services may be implemented in a plurality of manners. In some examples, user devices may communicate with each other by using a direct radio link. A user device may also act as a relay for one or more user devices, device, for example, two user devices may communicate with each other via another user device. Further or additional implementation of proximity-based services may include a device-to-device cluster in which one user device may act as a cluster header, for example providing some services which are typically provided by an access node in order to coordinate device-to-device communication device within the cluster.

In order a user device is able to determine whether there are one or more other user devices available for proximity-based communication, the user device may carry out a discovery process, such as ProSe/D2D discovery. A user device may carry out a discovery process itself or be discovered by another user device periodically or occasionally, for example on the receipt of a beacon from another user device or by initiating device-to-device communication. A user device carrying out a discovery may detect the presence of another user device based on a signal it transmits. On the other hand, by receiving a signal, a user device may detect a another user device with which it may want to communicate. The signal may be for example a beacon transmitted by a user device to indicate its availability for proximity-based services.

In order to facilitate a discovery and selection of user devices that are appropriate to proximity-based communication, each user device may be provided with discovery range information. This discovery range information may relate to a range class associated with the use device. The range class may be seen as a rough indication of distance for use in (ProSe) discovery, based, for example, on a geographical distance, conditions of a radio channel etc. The number of range classes may vary case by case. For example, a ProSe discovery is designed to support at least three range classes corresponding to a short, medium or maximum range. Each class and/or the number of classes may be adopted according to current needs, area topology, the number of devices in the area, etc. The range classes or their hierarchy may be determined by an operator, for instance, in the part of a network configuration or as a separate action. It may also be updated according to needs. For example, a range class may indicate that a user device suitable for proximity-based services should be within a certain range from the user device carrying out the discovery.

It will also be appreciated that a user device may be in both roles in the discovery: it may carry out a discovery and be discovered (or "invited" to proximity-based communications). It will be appreciated that the term "discover" may refer to discovering that a detected user device is suitable for device-to-device communication. It will be appreciated that a user device may be considered detected by a user device carrying out the discovery when it receives a beacon signal.

The embodiments have been described in relation to D2D in the context of 3GPP with Type 1 and 2 pools. It should be appreciated that other embodiments may be used with different standards. Different embodiments may be used with pools which are defined differently and/or referred to by different terminology. It should be understood that each block of the flowcharts and any combination thereof may be implemented by various means or their combinations, such as hardware, software, firmware, one or more processors and/or circuitry. An apparatus suitable to carry out embodiments described above may in general include at least one processor, controller or a unit designed for carrying out control functions and being operably coupled to at least one internal or external memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices.

The apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof.

It should be understood that conveying, broadcasting, signalling, transmitting and/or receiving may herein mean preparing a data conveyance, broadcast, transmission and/or reception, preparing a message to be conveyed, broadcasted, signalled, transmitted and/or received, or physical transmission and/or reception itself, etc. on a case by case basis. The same principle may be applied to the terms transmission and reception as well.

It is also noted herein that while the above describes exemplifying embodiments of the invention, there are several variations and modifications which may be made to the disclosed solution without departing from the scope of the present invention.

The invention claimed is:

1. A method for a control apparatus in a network device, the method comprising:
coordinating, between network devices operating in a heterogeneous network environment, common information indicative of one or more pools of resources for discovery signal transmission for direct communication between user devices, each user device being provided with discovery range information relating to a range class suitable for the direct communication, the heterogeneous network environment including at least one macro cell and at least one smaller-than-macro cell deployed under said at least one macro cell and at least partially in a coverage area of said at least one macro cell, said at least one smaller-than-macro cell covering a smaller area than said at least one macro cell;
obtaining, for a macro cell device from a smaller-than-macro cell device, the smaller-than-macro cell device having contributed resources to one of the pools, information about the resources requested by the smaller-than-macro cell device for use as an exclusive portion;
resolving any conflict over the requested resources;
allocating the requested resources or other resources to the smaller-than-macro cell device for exclusive use;
advising the smaller-than-macro cell device of the allocated resources; and
advertising said common information to at least one user device in said coverage area of said at least one macro cell by broadcast messages or dedicated signaling,
wherein the one or more pools of resources are shared between the at least one macro cell and the at least one smaller-than-macro cell.

2. The method as claimed in claim 1, wherein at least one pool of resources from said at least one macro cell is commonly shared by said at least one macro cell and said at least one smaller-than-macro cell.

3. The method as claimed in claim 2, further comprising allocating resources from said commonly shared pool on a non-device-specific basis in a Type 1 discovery procedure.

4. The method as claimed in claim 1, wherein at least one pool of resources is exclusively shared for said at least one smaller-than-macro cell by said at least one macro cell and said at least one smaller-than-macro cell.

5. The method as claimed in claim 4, further comprising allocating resources from said exclusively shared pool on a device-specific basis in a Type 2 discovery procedure.

6. The method as claimed in claim 1, further comprising causing information to be sent from a smaller-than-macro cell base station to at least one user device, said information indicating that said user device is to obtain pool information from a macro cell base station.

7. The method as claimed in claim 1, further comprising allocating said pool of resources to one or more cells of said at least one macro cell and at least one smaller-than-macro cell.

8. A computer program product comprising a non-transitory computer-readable storage medium bearing computer program code embodied therein for use with a computer, the computer program code comprising code for performing the method according to claim 1.

9. A method for a user device, the method comprising:
receiving common information from a control apparatus in a network device, said common information being indicative of one or more pools of resources for discovery signal transmission for direct communication between user devices, each user device being provided with discovery range information relating to a range class suitable for the direct communication; and
using a resource from said one or more pools of resources for direct communication with a second user device,
wherein a smaller-than-macro cell device has contributed resources to one of the pools, and information about the resources requested by the smaller-than-macro cell device for use as an exclusive portion has been obtained for a macro cell device;

wherein any conflict over the requested resources has been resolved;

wherein the requested resources or other resources have been allocated to the smaller-than-macro cell device for exclusive use; and wherein the smaller-than-macro cell device has been advised of the allocated resources.

10. The method as claimed in claim 9, wherein at least one pool is such that the allocation of resources from said pool is on a non-device-specific basis in a Type 1 discovery procedure.

11. The method as claimed in claim 9, wherein at least one pool such that the allocation of resources from said pool is on a device-specific basis in a Type 2 discovery procedure.

12. The method as claimed in claim 9, wherein the pool providing said resource is dependent on at least one of:

the cell with which the user device is associated; and
capabilities of the cell with which the user device is associated.

13. The method as claimed in claim 9, further comprising, responsive to determining that a resource from a first type of pool is required, causing the user device to camp in a macro cell.

14. An apparatus, the apparatus being a control apparatus in a network device, the apparatus comprising:

at least one processor; and
at least one memory including computer code for one or more programs, the at least one memory and the computer code configured, with the at least one processor, to cause the apparatus at least to:
coordinate, between network devices operating in a heterogeneous network environment, common information indicative of one or more pools of resources for discovery signal transmission for direct communication between user devices, each user device being provided with discovery range information relating to a range class suitable for the direct communication, the heterogeneous network-environment including at least one macro cell and at least one smaller-than-macro cell deployed under said at least one macro cell and at least partially in a coverage area of said at least one macro cell, said at least one smaller-than-macro cell covering a smaller area than said at least one macro cell;
obtain, for a macro cell device from a smaller-than-macro cell device, the smaller-than-macro cell device having contributed resources to one of the pools, information about the resources requested by the smaller-than-macro cell device for use as an exclusive portion;
resolve any conflict over the requested resources;
allocate the requested resources or other resources to the smaller-than-macro cell device for exclusive use;
advise the smaller-than-macro cell device of the allocated resources; and
advertise said common information to at least one user device in said coverage area of said at least one macro cell by broadcast messages or dedicated signaling,
wherein the one or more pools of resources are shared between the at least one macro cell and the at least one smaller-than-macro cell.

15. The apparatus as claimed in claim 14, wherein at least one pool of resources from the at least one macro cell is commonly shared by said at least one macro cell and said at least one smaller-than-macro cell or at least one pool of resources is exclusively shared for said at least one smaller-than-macro cell by at least one macro cell and said at least one smaller-than-macro cell.

16. The apparatus as claimed in claim 14, wherein the at least one memory and the computer code are further configured, with the at least one processor, to cause information to be sent, said information indicating that said user device is to obtain pool information from a base station of said macro cell.

17. The apparatus as claimed in claim 14, wherein the at least one memory and the computer code are further configured, with the at least one processor, to control the assigning of resources of said at least one pool, the apparatus being in a base station of the macro cell.

18. An apparatus, the apparatus being a user device comprising:

at least one processor; and
at least one memory including computer code for one or more programs, the at least one memory and the computer code configured, with the at least one processor, to cause the apparatus at least to:
receive common information from a control apparatus in a network device, said common information being indicative of one or more pools of resources for discovery signal transmission for direct communication between user devices, each user device being provided with discovery range information relating to a range class suitable for the direct communication; and
using a resource from said one or more pools of resources for direct communication with a second user device,
wherein a smaller-than-macro cell device has contributed resources to one of the pools, and information about the resources requested by the smaller-than-macro cell device for use as an exclusive portion has been obtained for a macro cell device;
wherein any conflict over the requested resources has been resolved:, wherein the requested resources or other resources have been allocated to the smaller-than-macro cell device for exclusive use; and
wherein the smaller-than-macro cell device has been advised of the allocated resources.

19. The apparatus as claimed in claim 18, wherein the pool providing said resource is dependent on at least one of:
the cell with which the user device is associated; and
capabilities of the cell with which the user device is associated.

* * * * *